Figure 1:
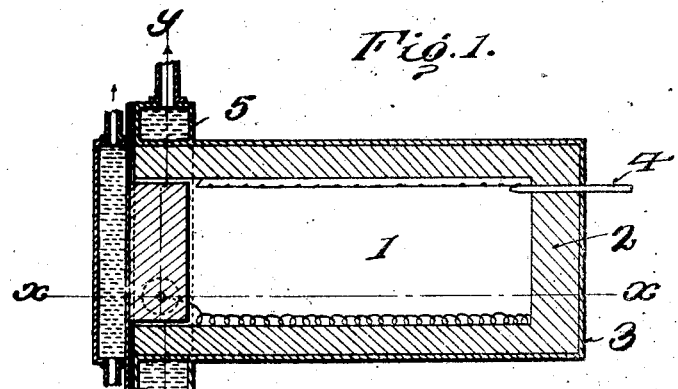

F. FISCHER.
PROCESS OF AND APPARATUS FOR HEATING.
APPLICATION FILED OCT. 6, 1913.

1,099,595.

Patented June 9, 1914.

Inventor
Franz Fischer
By K. P. McElroy
Attorney

Witnesses
H. Schoenthal

UNITED STATES PATENT OFFICE.

FRANZ FISCHER, OF CHARLOTTENBURG, GERMANY.

PROCESS OF AND APPARATUS FOR HEATING.

1,099,595.  Specification of Letters Patent.  Patented June 9, 1914.

Application filed October 6, 1913. Serial No. 793,691.

*To all whom it may concern:*

Be it known that I, Dr. FRANZ FISCHER, a subject of the Empire of Germany, residing at Charlottenburg, in the Empire of Germany, have invented certain new and useful Improvements in Processes of and Apparatus for Heating, of which the following is a specification.

This invention relates to processes of and apparatus for heating; and it comprises a process of heating wherein an object of any material, such as metals, plastic ceramic material, etc., is heated by being maintained in an atmosphere of hydrogen, or of gas rich in hydrogen, in proximity to a metallic or other heating element through which a heating current passes, the relative location of the two being such that circulation of hydrogen therebetween is unimpeded and such hydrogen being protected against cooling; and it further comprises an electric furnace having a closed chamber of refractory material provided with interiorly disposed heating elements or resistors of metal or the like and adapted to support material to be heated located in proximity thereto and without intervening walls or jacketing elements for the resistors to impede transmission of heat between the heating elements and such material and means for supplying hydrogen or gas rich in hydrogen to the interior of the chamber; all as more fully hereinafter set forth and as claimed.

In the customary methods of heating by electrical energy it is usual to heat a wall or walls of the heating chamber and impart heat thence to the object to be heated, the radiation from such walls being relied on for the conveyance of heat to a greater or less extent. Frequently, wires of some refractory metal, such as platinum, tungsten, nickel-chromium alloys, etc., are embedded in the refractory lining of a steel cased chamber near its inner wall surface, this embedding being to protect such wires from the action of the chamber atmosphere. The wire then gives heat to the lining and the lining to the chamber. Sometimes the wall, which is then usually of graphite, is itself the resisting and heat-generating element. Apart from other circumstances, this wall heating is disadvantageous in that it limits the size of the chamber since radiative heating diminishes rapidly in efficiency with an increase in chamber size. The heating chamber is usually maintained full of air, or, and more frequently, full of what is virtually products of combustion; the air reacting with carbon or carbonaceous material which is practically always present, and which may occur in the heating elements, to form a mixture of carbon dioxid and nitrogen. Apart from the chemical properties of the air or products of combustion, and both are freely oxidizing to most of the metals, an atmosphere of this character has the disadvantage that it does not carry heat quickly. A vacuum, which is sometimes used to avoid oxidation phenomena, is of course still worse as regards carrying heat. Ordinarily the development of heat is, at least in part, above the thing to be heated and communication of heat thereto is therefore, to this extent, against convection. Air and products of combustion are poor conductors of heat, either by sheer conduction, by convection or by diffusion. Nitrogen is like air.

In practice, operating with steel jacketed furnaces having wall-embedded resistors, and particularly with large furnaces, it is found that at temperatures such as 1000° C. and beyond, the jackets of the furnaces, even when protected with an exterior layer of fireclay or other refractory material, are destroyed in a short time by oxidation. The resistance coils which are embedded in the refractory material and communicate heat to the interior of the furnace through the intervening layer of refractory material also communicate heat to the outer jacket in the same way. In the present invention these difficulties are obviated and a number of new advantages secured by locating the resisting or heat-developing elements within the furnace chamber itself instead of within its walls and at any distance from the walls that may be desired, and by employing hydrogen, or a gas rich in free hydrogen, as the means for conveying the heat from the resistor to the object to be heated. The walls in lieu of being heat-imparting elements are heat-retaining or heat-insulating elements. Advantageously naked resistor wires are placed in the chamber at a relatively low level. As hydrogen has no oxidizing or other detrimental influence upon metals at a high temperature, the location of a naked resistor within the furnace chamber is not disadvantageous and in practice it may be placed in such proximity to the object to be heated as may be desired.

Advantageously, it is spaced somewhat away from the wall although in the case of a cylindrical wire, or a coiled wire, it may touch the same. The less, however, the area contacting with the wall, the greater is the area exposed to hydrogen and the more the advantages of the present invention are secured. It is therefore best to space them away from the wall as much as possible. Hydrogen has a very high rate of conduction for heat, and particularly at high temperatures, and it also has a high rate of diffusion and of convection. Roughly, the rate of diffusion of hydrogen is only a little less than four times as fast as the rate of diffusion of air. With this high heat-conveying capacity of hydrogen to exercise a cooling effect, resistor wires bathed in hydrogen may be safely run with much more current than would be feasible with the same wires in contact with air, with refractory material, or with another gas than hydrogen; or, what is the same thing, for the same amount of heat developed less wire need be used.

It is a great advantage of the present invention that resistors may be safely run at temperatures but little below those at which the metal of the resistor would yield, allowing development of higher temperatures; and that with a given wire the object to be heated may be brought to a temperature very nearly that developed in the wire; i. e., the object may be heated hotter with such wire than in the usual ways of heating with the same wire. With resistor wires as usually employed, in view of the necessity for shielding them against the attack of the ordinary atmospheres and the bad heat conductivity of air, nitrogen, vacuum, etc., and the consequent necessity for relying largely on radiation for conveyance of heat, ordinarily the resistors must be run at a much higher temperature than that intended to be imparted to the article to be heated; there must be a comparatively large temperature differential between the heating element and the thing to be heated. In the present invention because of the high capacity of hydrogen for receiving and imparting heat, the temperature differential between the resistance element and the thing to be heated can be much lessened. This results in an economy of material and of energy. And since no attempt is made to utilize the walls as heat-radiating or heat-imparting elements, reliance being placed on the heat conductivity of hydrogen, the naked resistors may be located anywhere within the heating chamber, and in any spaced distribution desired, thereby enabling the use of heating chambers of any size. But it is best to place them near the floor of the chamber. An advantageous arrangement is to place a coil of wire around the chamber just above the floor and near the side walls. Since the heat is not developed in the wall, the jackets do not suffer in the usual way; and moreover any type of lining or of interior heat insulation may be employed. Water jackets for the exterior of the furnace may be used.

The resistors may be of any of the high melting metals such as platinum, tungsten, tantalum, nickel alloys, chromium alloys, etc., since these metals are all permanent in hydrogen. The greater the free space filled with hydrogen surrounding the resistors, the greater is the amount of current which can be sent through them and the greater can be the development of heat per second without the risk of raising the metal to a temperature sufficient to endanger it. The conduction and communication of heat by hydrogen is so rapid that as long as cooler objects are in the vicinity, it is difficult to overheat a wire bathed in hydrogen and out of contact with a heat retaining surface. A comparatively small naked resistance wire in and freely exposed to an atmosphere of hydrogen will suffice to bring up to approximately its own temperature a neighboring, comparatively large object to be heated. While I regard the arrangement of resistors and objects to be heated shown in the accompanying illustrations to be highly advantageous, any other arrangement may be used which utilizes the principles herein set forth.

While it is best to use pure hydrogen in order to secure a maximum of the results sought, I may use other gases rich in free hydrogen, as for instance ordinary "blue" gas (uncarbureted water gas). But a gas rich in hydrogen and free from carbon monoxid or carbon dioxid is better. Electrolytic hydrogen or hydrogen made with iron may be used. The hydrogen may be introduced and removed as a continuous current, but there is no particular object in the present invention in making this current a lively one, unless reduction as well as heating be desired. It suffices to introduce enough to replace the original atmosphere of the chamber and to compensate for accidental leakage, diffusion, etc.

The object to be heated may be of any shape, size or character, and may be of any material, such as ceramic material, metal, etc. Materials which are readily reduced by hot hydrogen will of course undergo other actions than those here desired, the heating being attended by reduction. The articles to be heated may be supported on supports of any suitable refractory material, such as sand, fireclay, titanium oxid, etc., or may be located directly on the chamber floor. Graphite and other forms of carbon may be employed as supports for the article, and indeed may even be employed as resistors, since at most of the temperatures contemplated in the use of the electric furnace, the hydrogen has no particular action upon carbon. At a very high temperature however methane may form and be again broken up with production of sooting. Ordinarily I prefer to have the furnace chamber free of carbon in any form.

It must be remembered in designing apparatus embodying the present invention that the high heat conductivity of hydrogen means a very even distribution of heat throughout the heating chamber, and that it is difficult to attain therein any local high heating such as is common with chambers filled with other gases. Ordinarily therefore the design should be such as to have as little chamber space unoccupied by heat developing elements and material to be heated as possible; in other words, it is inadvisable to have the chamber larger than is required for the needs of the heating operation to be carried out. Circulation of hydrogen between the resistors and the material must however be unimpeded by intervening objects or walls. Chambers of indefinite size may be employed under the present invention but the larger the chamber the more heat must be introduced into it, since, as stated, heating throughout the chamber will be very nearly uniform. Because of the ready diffusibility of hydrogen and the speed with which it escapes through all cracks and pores, it is necessary to have the chamber as tight as possible and to have efficient sealing means for the doors, etc. Water cooled elements may be used to secure efficient joints. The high heat conductivity of hydrogen also necessitates as good heat insulation as may be of the containing chamber.

In the accompanying illustration I have shown, more or less diagrammatically, an embodiment of apparatus elements within the described invention and capable of use in the described process.

Figure 2:
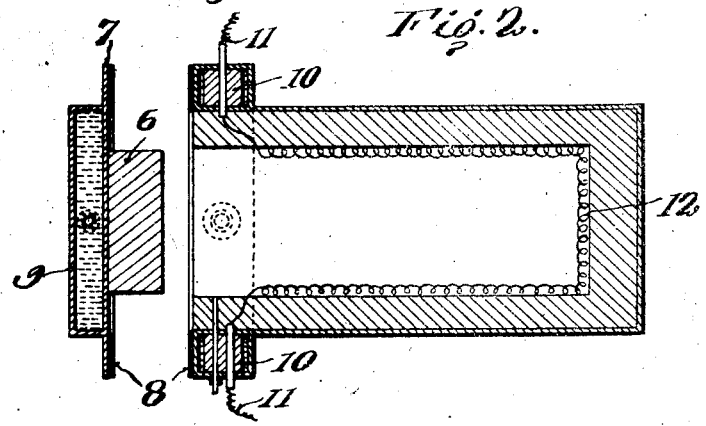
Figure 3:
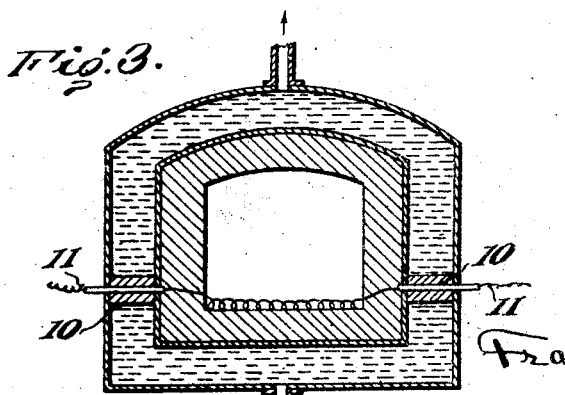

In this showing Figure 1 is a central vertical section of a heating chamber; Fig. 2 is a horizontal section along line x—x of Fig. 1; and Fig. 3 is a vertical section of Fig. 1 at right angles to the showing of Fig. 2, and along line y—y.

In this showing, furnace chamber 1 is constituted by an open ended casing 2 of magnesia, firebrick, or other suitable refractory and heat-insulating material capable of withstanding the temperatures to be employed. A steel jacket 3 gives the necessary strength. Near the roof inlet pipe 4 is provided for the introduction of hydrogen. This pipe may be perforated at intervals. As shown, the front of the furnace is open. At this point it may be provided with a water jacket casing 5 surrounding it. Fitting in the end of the chamber is a door having projecting portion or block 6 of refractory material extending inwardly some distance; a distance which may be equivalent to the distance to which the water jacket extends on the furnace. This block fits as nearly as may be against the interior walls of the furnace. It is carried on an iron plate 7 which may carry a gasket 8 of rubber or the like adapted to make a tight joint against the water jacket casing. The plate is cooled by a water jacket 9. Extending through a body of insulating material 10 in the water jacket are two current leads 11—11. Within the furnace chamber is resistor wire 12, shown as lying in the corner formed by the bottom of the chamber and the side walls and as encircling the chamber. This is convenient and allows the greater portion of the floor of the furnace to be unobstructed.

In the use of the above structure, the material to be heated or treated having been placed in the furnace either on the floor or on a suitable support, the door is placed in position with a loose fit and hydrogen, or hydrogen containing gas, is introduced through 4 until the air is substantially displaced. The door is now placed in such position as to make a tight fit and heating begun by sending a suitable current through the resistor 12 from current leads 11. Water is kept circulating through 5 and 9 in such amount as may be necessary. By placing the resistors outside the casing wall and spaced away therefrom, annoyance and inconvenience by conduction of current through the refractory material itself is avoided. Most refractory materials used for lining furnaces become second-class conductors at high temperatures and it is difficult to insulate a resistor against loss of current in this way.

What I claim is:—

1. In the art of heating, the process which comprises maintaining an object to be heated in proximity to an electrically heated metallic resistor element in a suitable chamber full of hydrogen, said resistor elements being bathed in said hydrogen and said chamber having walls of heat-retaining material at all surfaces exposed to said hydrogen.

2. In the art of heating, the process which comprises maintaining an object to be heated in proximity to an electrically heated wire, both said object and said wire being bathed in and surrounded by an atmosphere of hydrogen contained in a chamber of low heat conductivity.

3. In the art of heating, the process which comprises placing a body to be heated within a chamber having all interior walls of refractory, heat-retaining material, filling said chamber with hydrogen and producing electrical heat in a resistor bathed by said hydrogen.

4. In the art of heating, the process which comprises placing a body to be heated within a chamber having all interior walls of refractory, heat-retaining material, filling said chamber with hydrogen, and producing electrical heat in a resistor bathed by said hydrogen and disposed at a low level within said chamber.

5. An electric furnace having a closed chamber provided with interiorly disposed heating elements or resistors of metal or the like freely exposed to the atmosphere in the chamber, inner walls of refractory material for said chamber, and means for supplying hydrogen or gas rich in hydrogen to the interior of the chamber.

6. An electric furnace having a closed chamber with all interior walls of refractory, heat-retaining material, means for supplying hydrogen to the interior of the chamber and resistor elements disposed within said chamber and interiorly beyond said walls.

7. In an electric furnace, a metal jacketed chamber having interior walls of refractory, heat-retaining material, means for introducing hydrogen in said chamber, resistor elements within said chamber at a low level and interiorly beyond said wall and a closure of refractory material for said chamber.

8. In an electric furnace, a metal jacketed chamber having interior walls of refractory, heat-retaining material, means for introducing hydrogen in said chamber, resistor elements within said chamber at a low level and interiorly beyond said wall, a closure of refractory material for said chamber and water jacketed sealing elements for said closure.

In testimony whereof, I affix my signature in the presence of two subscribing witnesses.

Dr. FRANZ FISCHER.

Witnesses:
 WOLDEMAR HAUPT,
 HENRY HASPER.